(12) United States Patent
Zhuang et al.

(10) Patent No.: US 10,805,986 B2
(45) Date of Patent: Oct. 13, 2020

(54) GATEWAY OF INTERNET OF THINGS SUPPORTING BLUETOOTH, WIFI PROTOCOL AND ADJUSTMENT OF SMART LIGHT

(71) Applicants: Yan Zhuang, Shenzhen (CN); Wei Lin, Shenzhen (CN)

(72) Inventors: Yan Zhuang, Shenzhen (CN); Wei Lin, Shenzhen (CN)

(73) Assignee: SHENZHEN MINEW TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 16/257,095

(22) Filed: Jan. 25, 2019

(65) Prior Publication Data

US 2019/0320497 A1 Oct. 17, 2019

(30) Foreign Application Priority Data

Apr. 17, 2018 (CN) ...................... 2018 2 0541928 U

(51) Int. Cl.
| | |
|---|---|
| *H04L 12/28* | (2006.01) |
| *H04W 88/16* | (2009.01) |
| *H04W 4/80* | (2018.01) |
| *G06F 13/40* | (2006.01) |
| *H05B 45/20* | (2020.01) |

(52) U.S. Cl.
CPC ........ *H04W 88/16* (2013.01); *G06F 13/4068* (2013.01); *H04W 4/80* (2018.02); *H05B 45/20* (2020.01); *G06F 2213/0042* (2013.01)

(58) Field of Classification Search
None
See application file for complete search history.

(56) References Cited

U.S. PATENT DOCUMENTS

| | | | |
|---|---|---|---|
| 10,088,112 B2* | 10/2018 | Crayford | ................. F21V 3/061 |
| 2013/0033178 A1* | 2/2013 | Huang | .................. H05B 47/19 |
| | | | 315/86 |
| 2015/0259078 A1* | 9/2015 | Filipovic | .............. G05D 1/0011 |
| | | | 244/114 R |
| 2016/0255697 A1* | 9/2016 | Bhide | ...................... F24F 11/62 |
| | | | 315/161 |
| 2017/0180149 A1* | 6/2017 | McConnell | ............ H05B 47/19 |

(Continued)

*Primary Examiner* — Gerald A Smarth

(57) ABSTRACT

This invention refers to a gateway of Internet of Things which supports Bluetooth, WiFi protocol and adjustment of smart light. From top to bottom, it consists of the movably connected top cover, surface cover, and bottom shell. The top cover fastens the shading film, light guide plate and light panel to surface cover's step surface from the top down successively; the surface cover is equipped with a Bluetooth antenna and a WiFi antenna on its inner wall; there is an electric connection between main board within the bottom shell and light panel, Bluetooth antenna and WiFi antenna. Besides locating multiple devices which support BLE protocol within about 350-meter-radius range and acquiring their data, this structure uploads the data to cloud server and exercises real-time control over these devices. Meanwhile, users may log into cloud server by mobile phone to control RGB SMD lamp—adjust light color and display model in real time. Thus, it can be seen that this structure can offer various lighting combinations that can improve user experience.

7 Claims, 3 Drawing Sheets

(56) References Cited

U.S. PATENT DOCUMENTS

Figure 1:
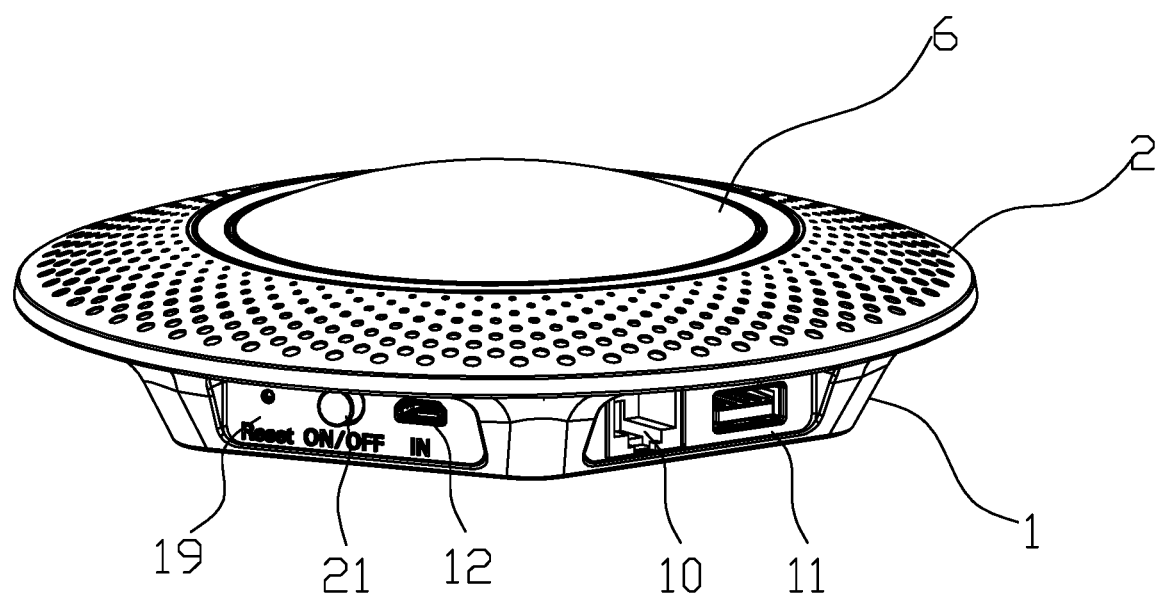

| | | | |
|---|---|---|---|
| 2017/0295629 A1* | 10/2017 | Chiu | F21K 9/68 |
| 2018/0027359 A1* | 1/2018 | Gonzalez | H04W 4/70 |
| | | | 370/254 |
| 2018/0120826 A1* | 5/2018 | Rhim | H04L 41/0866 |
| 2018/0343403 A1* | 11/2018 | Mehdi | H04N 5/23245 |

* cited by examiner

GATEWAY OF INTERNET OF THINGS SUPPORTING BLUETOOTH, WIFI PROTOCOL AND ADJUSTMENT OF SMART LIGHT

TECHNICAL FIELD

This invention refers to a gateway of Internet of things supporting Bluetooth, WiFi protocol and adjustment of smart light in the field of the facilities of Internet of Things.

TECHNICAL BACKGROUND

Along with the development of Internet of Things technology, BLE devices are increasingly popular among people and put into use due to low cost and long duration. These devices only accept real-time data acquisition and management at close range, which not only requires large quantities of human and material resources, but also results in low efficiency. It is urgent to deal with data acquisition and remote management of devices at a wide range through Cloud.

Contents of Invention

To cope with shortcomings of existing technologies, this invention is aimed at offering the gateway of the Internet of Things supporting Bluetooth, WiFi protocol and adjustment of smart light.

To achieve the aims above, this invention adopts following technical schemes: from top to bottom, the gateway of Internet of things supporting Bluetooth, WiFi protocol and adjustment of smart light consists of the movably connected top cover, surface cover, and bottom shell. The top cover fastens the shading film, light guide plate and light panel to surface cover's step surface from the top down successively; the surface cover is equipped with a Bluetooth antenna and a WiFi antenna on its inner wall; there is an electric connection between main board within the bottom shell and light panel, Bluetooth antenna and WiFi antenna. The main board is equipped with a network interface, an USB interface, TF card slot, Micro 5Pin USB power supply interface, self-locking switch, reset switch, and test switch; the vertical surface of the bottom shell is furnished with a through-hole corresponding to functional interface.

Preferably, the front surface of the surface cover provides rounded installation space for step surface, within which there is light panel, light guide panel and shading film; the ring-shaped surface around the installation space is furnished with honeycombed holes; the light panel is armed with several RGB SMD lights, which are arranged circularly, and the shading film looks like a circular ring.

Preferably, the light panel is furnished with the first FPC connecting base, and the main board with the second FPC connecting base; the two bases are connected with each other via FPC.

Preferably, the main board is characterized by Bluetooth control circuit which is furnished with the first IPEX terminal, and WiFi control circuit which is armed with the second IPEX terminal; the Bluetooth antenna on the inner wall of surface cover is linked with the first IPEX terminal via antenna feeder, which is also used to connect WiFi antenna with the second IPEX terminal.

Preferably, the main board is furnished with a TF card slot, and the vertical plate of the bottom shell has a through-hole for TF card slot.

Preferably, the main board has a self-locking switch, a reset switch and a test switch, and the vertical plate of the bottom shell is designed with a through-hole for outside control over self-locking switch and reset switch. The through-hole corresponding to the self-locking switch has a switch cap, and there is a contact between inner end of switch cap and self-locking switch, with its outer end outside bottom shell.

The bottom shell is equipped with a locating sticker at its bottom.

Beneficial technical results: the main board is characterized by Bluetooth control circuit. There is an electric connection between Bluetooth antenna and Bluetooth control circuit, as well as between WiFi antenna and WiFi control circuit. Besides locating multiple devices which support BLE protocol within about 350-meter-radius range and acquiring their data, this product uploads the data to cloud server and exercises real-time control over these devices so that users can get real-time information of devices and exercise real-time control over these devices. The front surface of the surface cover is equipped with light panel, light guide panel and shading film which are fixed by top cover. The light panel is armed with several RGB SMD lights, which are arranged circularly, and the light panel is electrically connected with the main board, which only supsports small-area decoration and illumination. Meanwhile, users may log into cloud server by mobile phone to control RGB SMD lamp—adjust light color and display model in real time. Thus, it can be seen that this product can offer various lighting combinations that can improve user experience.

EXPLANATIONS ON FIGURES

Figure 2:
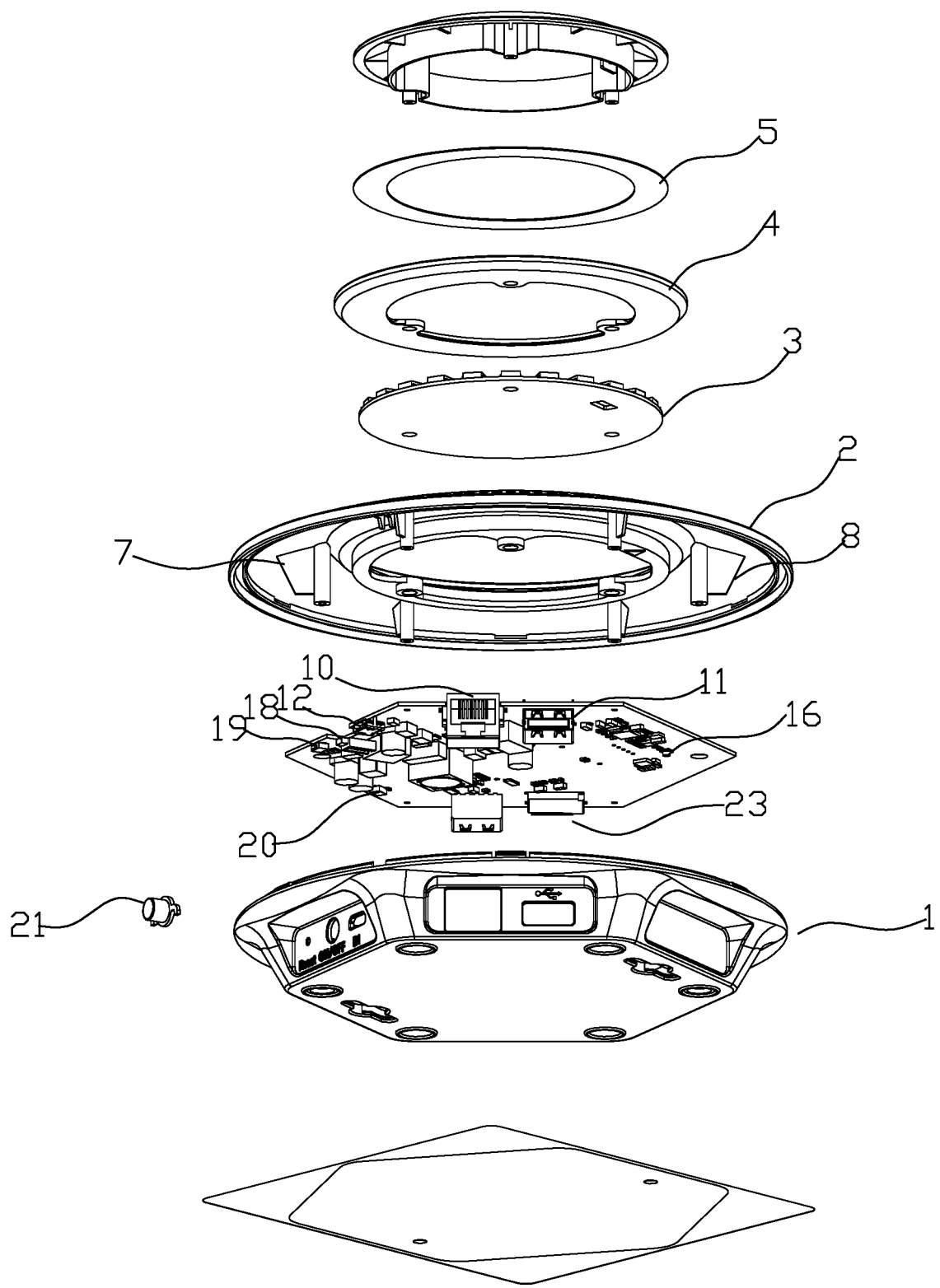
Figure 3:
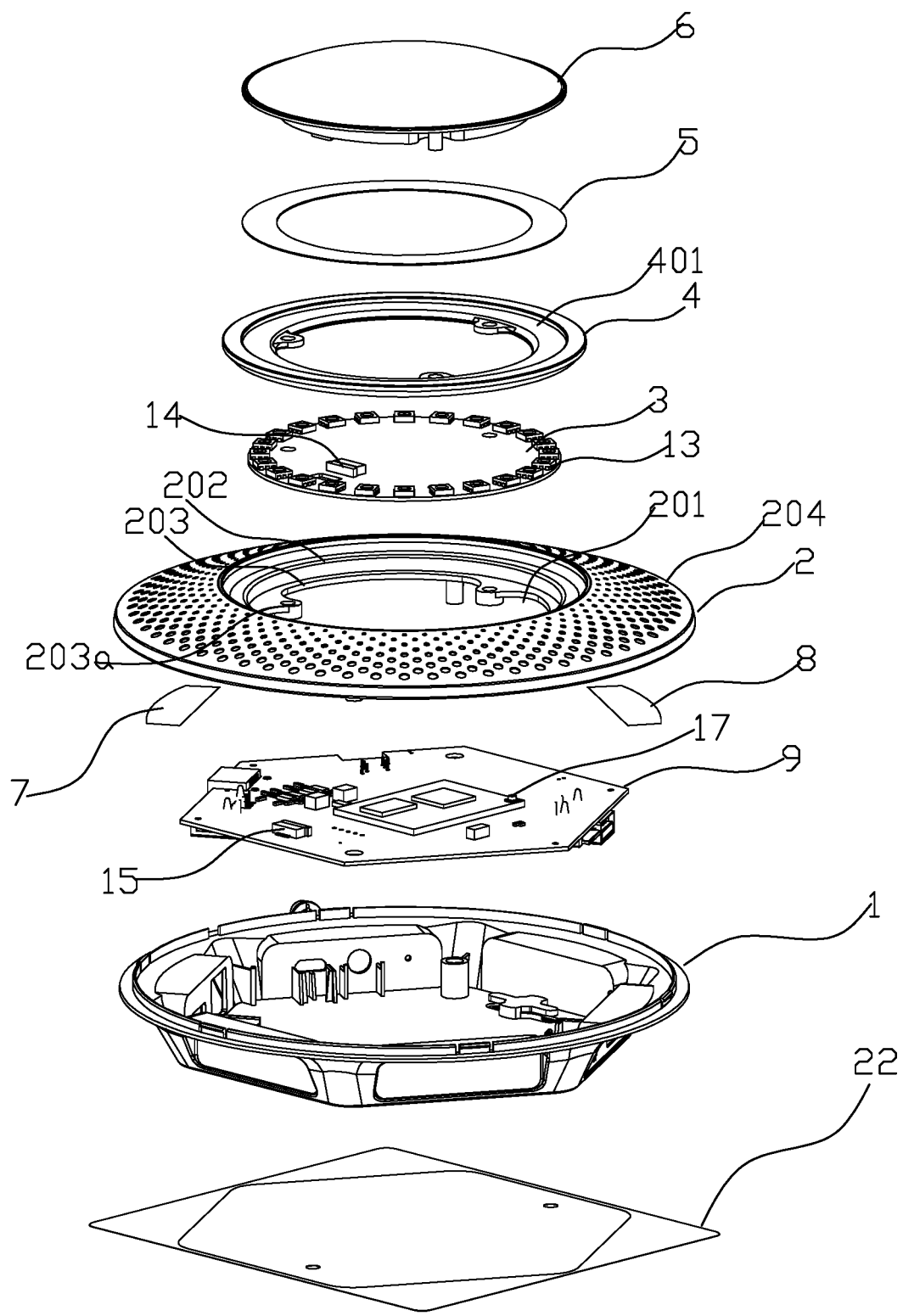

FIG. 1: Stereogram of this invention.
FIG. 2: Exploded stereogram of this invention.
FIG. 3: Exploded stereogram of another angle of this invention.

SPECIFIC IMPLEMENTATION MODE

Further explanations on this invention will be made in combination with figures and implementation modes so that technicians in this field will have a better understanding of this invention.

As revealed by FIGS. 1-3, the gateway of Internet of Things supporting Bluetooth, WiFi protocol and adjustment of smart light consists of the movably connected top cover 6, surface cover 2, and bottom shell 1 from top to bottom. The top cover 6 fastens the shading film 5, light guide plate 4 and light panel 3 to surface cover 2's step surface from the top down successively; the surface cover 2 is equipped with a Bluetooth antenna 7 and a WiFi antenna 8 on its inner wall; there is an electric connection between main board 9 within the bottom shell 1 and light panel 3, Bluetooth antenna 7 and WiFi antenna 8; the main board 9 is equipped with a network interface 10, an USB interface 11, TF card slot 23, Micro 5Pin USB power supply interface 12, self-locking switch 18, reset switch 19, and test switch 20; the polygonal vertical surface of the bottom shell 1 which looks like a bowl between polygon and circle is furnished with a through-hole corresponding to functional interface.

As RJ 45 network interface, network interface 10 can be connected with network or supply power for this invention via POE.

There are two USB interfaces 11, which are used for functional extension of USB communication. Besides, there is also one Micro 5PIN USB interface 12, which can supply power for this invention via USB cable.

The front surface of the surface cover 2 provides rounded installation space 201 for step surface, within which there is upward annular bulge 202 and downward annular bulge 203. The edge of the light panel is embedded in the annular groove between upward annular bulge 202 and downward annular bulge 203. The downward annular bulge is furnished with three connecting bosses 203a. The front surface of light guide panel 4 is furnished with an annular sinking base 401, which supports a shading film on its bottom. The light panel 3, light guide panel 4 and top cover are screwed with surface cover so that they can be fixed within installation space 201. The ring-shaped surface 204 around the installation space 201 is furnished with honeycombed holes; the light panel 3 is armed with several RGB SMD lights 13, which are arranged circularly, and the shading film 5 looks like a circular ring. The RGB SMD lights 13 can be adjusted by cloud server of mobile phone to assure switch between different color combinations.

The light guide panel 4 made of optical materials can show multiple internal reflections of light on its outer surface in a uniform way, whereas shading film restricts the range of light, only displaying an even light ring to users. The light ring can not only support large-area decoration and illumination as beautiful and even colors, but also allow users to adjust light cover by logging on to cloud server by mobile phone to improve user experience.

The light panel 3 is furnished with the first FPC connecting base 14, and the main board with the second FPC connecting base 15; the two bases are connected with each other via FPC to supply power for light panel 3.

The main board 9 is characterized by Bluetooth control circuit which is furnished with the first IPEX terminal 16 and WiFi control circuit which is armed with the second IPEX terminal 17; the Bluetooth antenna 7 on the inner wall of surface cover is linked with the first IPEX terminal 16 via antenna feeder, which is also used to connect WiFi antenna 8 with the second IPEX terminal 17. Besides locating multiple devices which support BLE protocol within about 350-meter-radius range and acquiring their data, this structure covers a large area which can reduce distribution density of gateway devices to lower user cost greatly.

The main board 9 has a self-locking switch 18, a reset switch 19 and a test switch 20, and the vertical plate of the bottom shell is designed with a through-hole for outside control over self-locking switch and reset switch. The through-hole corresponding to the self-locking switch 18 has a switch cap 21, and there is a contact between inner end of switch cap 21 and self-locking switch 18, with its outer end outside bottom shell.

The test switch 20 can assure convenient test operation in production. In case of software abnormality, the reset switch 19 can be stabbed with needle for the sake of factory reset. Switch cap 21 can be pressed to start self-locking switch 18 for on-off operation.

The main board 9 is furnished with a TF card slot 23, and the vertical plate of the bottom shell has a through-hole for TF card slot. Users may download and save the data acquired by this invention when inserting TF card.

The bottom shell 1 is equipped with a locating sticker at its bottom.

The main board 9 is characterized by Bluetooth control circuit.

There is an electric connection between Bluetooth antenna 7 and Bluetooth control circuit, as well as between WiFi antenna 8 and WiFi control circuit. Besides locating multiple devices which support BLE protocol within about 350-meter-radius range and acquiring their data, this product uploads the data to cloud server and exercises real-time control over these devices so that users can get real-time information of devices and exercise real-time control over these devices. The front surface of the surface cover 2 is equipped with light panel 3, light guide panel 4 and shading film 5 which are fixed by top cover 6. The light panel 3 is armed with several RGB SMD lights 13, which are arranged circularly, and the light panel 3 is electrically connected with the main board 9, which only supports small-area decoration and illumination. Meanwhile, users may log into cloud server by mobile phone to control RGB SMD lamp—adjust light color and display model in real time. Thus, it can be seen that this product can offer various lighting combinations that can improve user experience.

Though the examples are only aimed at describing this invention, ordinary technicians in this field are aware that many transformations and changes of this invention follow the tenet of this invention, and it is hoped that all claims hereof are composed of these transformations and changes without going against the tenet of this invention.

The invention claimed is:

1. A gateway of Internet of Things which supports Bluetooth, WiFi protocol and adjustment of smart light comprising:

a movably connected top cover, a surface cover, and a bottom shell;

wherein the top cover fastens a shading film, a light guide plate and a light panel to a step surface of the surface cover;

wherein the surface cover includes a Bluetooth antenna and a WiFi antenna on an inner wall thereof;

wherein an electric connection between a main board within the bottom shell and the light panel, the Bluetooth antenna and the WiFi antenna;

wherein the main board includes a network interface, an Universal Serial Bus (USB) interface, a TransFlash (TF) card slot, a Micro Pin USB power supply interface, a self-locking switch, a reset switch, and a test switch;

wherein a vertical surface of the bottom shell has a through-hole corresponding to a functional interface.

2. The gateway of Internet of Things as claimed in claim 1, wherein a front surface of the surface cover provides a rounded installation space for the step surface, within which the light panel, light guide plate and the shading film are fixed; a ring-shaped surface around the installation space has multiple honeycombed holes; the light panel is armed with multiple red, green, blue (RGB) Surface Mounted Devices (SMD) lights, which are arranged circularly, and the shading film is formed in a circular ring shape.

3. The gateway of Internet of Things as claimed in claim 1, wherein the light panel has a first Flexible Printed Circuit (FPC) connecting base, and the main board has a second FPC connecting base; the first FPC connecting base and the second FPC connecting bases are connected via a FPC.

4. The gateway of Internet of Things as claimed in claim 1, wherein a Bluetooth control circuit of the main board has a first terminal, and the WiFi control circuit is aligned with a second terminal; the Bluetooth antenna on an inner wall of the surface cover is linked with the first terminal via an antenna feeder, which is used to connect the WiFi antenna with the second terminal.

5. The gateway of Internet of Things as claimed in claim 1, wherein the main board has a TransFlash (TF) card slot, and a vertical plate of the bottom shell has a through-hole for the TF card slot.

6. The gateway of Internet of Things as claimed in claim 1, wherein the main board has a self-locking switch, a reset switch and a test switch, and a vertical plate of the bottom shell has a through-hole for outside controlling over a self-locking switch and a reset switch; the through-hole corresponding to the self-locking switch has a switch cap, and a contact between an inner end of the switch cap and the self-locking switch.

7. The gateway of Internet of Things as claimed in claim 1, wherein the bottom shell has a locating sticker on a bottom thereof.

* * * * *